United States Patent
Lin et al.

(10) Patent No.: US 10,788,712 B1
(45) Date of Patent: Sep. 29, 2020

(54) MULTI-FUNCTION LIGHT-ADJUSTING GLASS

(71) Applicant: NATIONAL SUN YAT-SEN UNIVERSITY, Kaohsiung (TW)

(72) Inventors: Tsung-Hsien Lin, Kaohsiung (TW);
Cheng-Chang Li, Kaohsiung (TW);
Heng-Yi Tseng, Kaohsiung (TW);
Hung-Chang Jau, Kaohsiung (TW);
Duan-Yi Guo, Kaohsiung (TW);
Li-Min Chang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/449,724

(22) Filed: Jun. 24, 2019

(30) Foreign Application Priority Data

Apr. 30, 2019 (TW) .............................. 108115113 A

(51) Int. Cl.
*G02F 1/1337* (2006.01)
*B32B 17/10* (2006.01)
*G02F 1/137* (2006.01)

(52) U.S. Cl.
CPC ...... *G02F 1/1337* (2013.01); *B32B 17/10174* (2013.01); *B32B 17/10458* (2013.01); *B32B 17/10504* (2013.01); *G02F 1/137* (2013.01)

(58) Field of Classification Search
CPC ........ B32B 17/10504; B32B 17/10174; B32B 17/10458; G02F 1/1337; G02F 1/1313; G02F 1/132; G02F 1/1334; G02F 1/13718; G02F 1/133536; G02F 1/133514; G02F 1/137; E06B 2009/2464; E06B 9/24

(Continued)

(56) References Cited

U.S. PATENT DOCUMENTS

| 5,448,386 A | * | 9/1995 | Watanabe ........... G02F 1/13363 349/119 |
| 2001/0035918 A1 | * | 11/2001 | Nakamura ........... C09K 19/542 349/10 |

(Continued)

FOREIGN PATENT DOCUMENTS

| JP | 2004-109787 A | 4/2004 |
| TW | 201821874 A | 6/2018 |

*Primary Examiner* — Shan Liu
(74) *Attorney, Agent, or Firm* — WPAT, PC

(57) ABSTRACT

A multi-function light-adjusting glass includes first and second substrates delimiting an intermediate space therebetween, a light-adjusting layer disposed in the intermediate space, and a first polarizing board located at an outer side of the first substrate away from the intermediate space, and a second polarizing board located at an outer side of the second substrate away from the intermediate space. Each substrate includes an electrically conductive film on an inner surface of the substrate facing the intermediate space, and an alignment film disposed between the electrically conductive film and the intermediate space. The two alignment films respectively have two alignment directions orthogonal to each other. The light-adjusting layer includes liquid crystal molecules and salt-in ions. When the two electrically conductive films apply a voltage to the light-adjusting layer, the liquid crystal molecules are in a discontinuous and chaotic arrangement and cause an incident light to scatter in the light-adjusting layer.

18 Claims, 6 Drawing Sheets

(58) Field of Classification Search
USPC .......................................................... 349/16
See application file for complete search history.

(56) References Cited

U.S. PATENT DOCUMENTS

| | | | |
|---|---|---|---|
| 2014/0226096 A1* | 8/2014 | Taheri | G02F 1/13306 349/33 |
| 2015/0153620 A1* | 6/2015 | Iwata | G02F 1/134309 349/123 |
| 2017/0115527 A1* | 4/2017 | Kita | G02F 1/1347 |
| 2019/0278115 A1* | 9/2019 | Khan | C09K 19/582 |
| 2019/0331946 A1* | 10/2019 | Zhou | G02F 1/1337 |

* cited by examiner

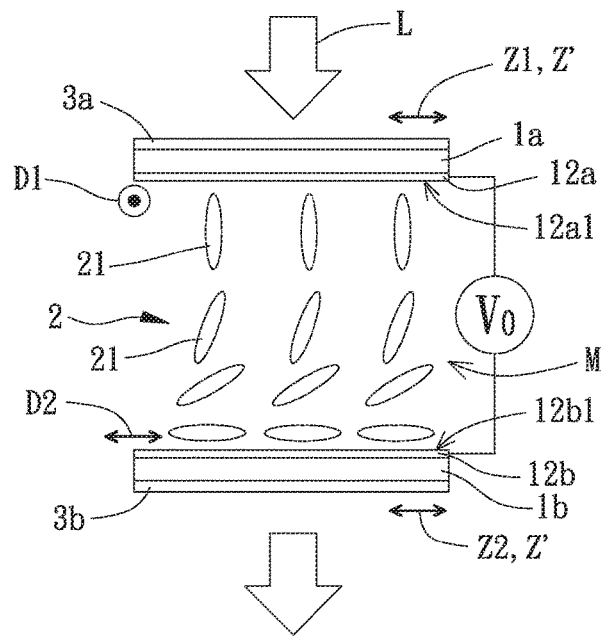
FIG. 2a
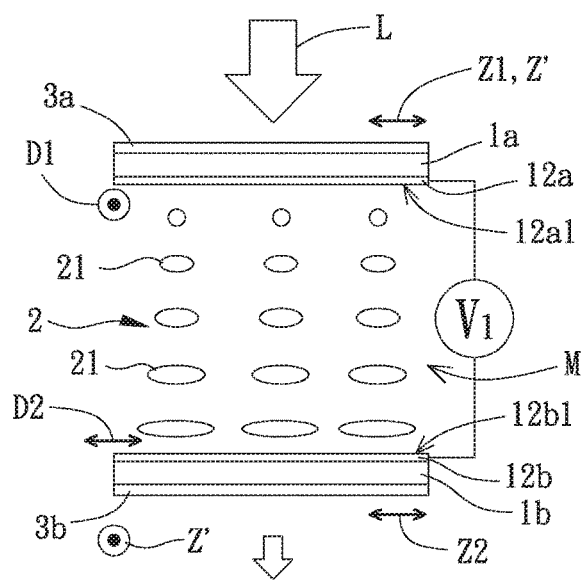 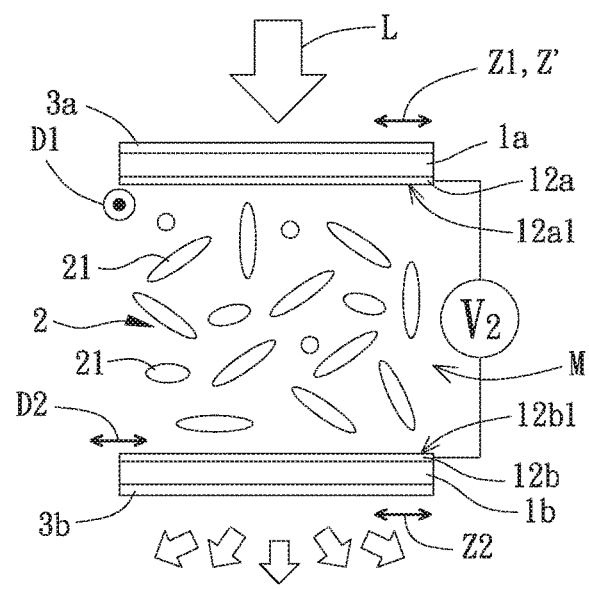
FIG. 2b               FIG. 2c

MULTI-FUNCTION LIGHT-ADJUSTING GLASS

CROSS REFERENCE TO RELATED APPLICATION

The application claims the benefit of Taiwan application serial No. 108115113, filed on Apr. 30, 2019, and the entire contents of which are incorporated herein by reference.

BACKGROUND OF THE INVENTION

1. Field of the Invention

The present invention generally relates to a photoelectric component and, more particularly, to a multi-function light-adjusting glass which can switch among the functions of light transmission, heat insulation and privacy protection.

2. Description of the Related Art

Glass is used to divide the space while allowing for light transmission and providing an open view. The conventional smart light-adjusting glass is made from special material whose light transmittance or light scattering condition is adjustable. The properties of the special material (such as liquid crystal glass, electrochromic glass or suspended particles device) can be changed through electrical control. The light transmittance of the special material can also be thermally adjusted, such as thermochromic gel. Also, the special material can be photochromic. In this regard, through the use of a plurality of light-adjusting materials and techniques, the conventional light-adjusting glass can switch between high light transmission and light absorption, or between high light transmission and light scattering condition.

The conventional light-adjusting glass can only switch to the light absorption or scattering conditions due to the limitations of material compatibility and adjusting techniques, which results in the limited functions of the conventional light-adjusting glass and reducing the interest of the consumers. Even though two different types of techniques can be incorporated to provide more functions to the light-adjusting glass, the thickness of the glass product becomes larger and the cost and the complexity in operating the glass product become higher, hindering the promotion of the light-adjusting glass. Besides, different materials used by different techniques cannot be easily used together. For example, the low miscibility between the liquid crystal and the dichroic dye causes non-uniform material distribution of the glass and adversely results in non-uniform light transmittance of the glass. Moreover, the use of the dichroic dye with low resistance to ultraviolet light affects the service life of the light-adjusting glass.

In light of this, it is necessary to improve the conventional light-adjusting glass.

SUMMARY OF THE INVENTION

It is therefore the objective of this invention to provide a multi-function light-adjusting glass which can switch among the functions of light transmission, heat insulation and privacy protection.

It is another objective of this invention to provide a multi-function light-adjusting glass whose structure is simplified to reduce the cost and complexity in the manufacturing process.

It is a further objective of this invention to provide a multi-function light-adjusting glass which can switch among individual functions and improve the applicability through simple but diverse techniques.

In an aspect, the multi-function light-adjusting glass comprises a first substrate disposed in a top side, a second substrate disposed in a bottom side, a light-adjusting layer, a first polarizing board and a second polarizing board. The first and second substrates delimit an intermediate space therebetween. The first substrate includes a first electrically conductive film on an inner surface of the first substrate facing the intermediate space, as well as a first alignment film disposed between the first electrically conductive film and the intermediate space. The second substrate includes a second electrically conductive film on an inner surface of the second substrate facing the intermediate space, as well as a second alignment film disposed between the second electrically conductive film and the intermediate space. The first alignment film has a first alignment direction orthogonal to a second alignment direction of the second alignment film. The light-adjusting layer is disposed in the intermediate space and including a plurality of liquid crystal molecules and a plurality of salt-in ions containing a type of salt, and the plurality of salt-in ions is distributed between the plurality of liquid crystal molecules. A portion of the plurality of liquid crystal molecules is relatively adjacent to the first alignment film and is aligned in the first alignment direction of the first alignment film, while another portion of the plurality of liquid crystal molecules is relatively adjacent to the second alignment film and is aligned in the second alignment direction of the second alignment film. The plurality of salt-in ions is affected by a voltage when the first and second electrically conductive films apply the voltage to the light-adjusting layer. The voltage disturbs the plurality of liquid crystal molecules and thereby causes a discontinuous and chaotic arrangement of the plurality of liquid crystal molecules and causes an incident light to scatter in the light-adjusting layer. The first polarizing board is located at an outer side of the first substrate away from the intermediate space, and the second polarizing board is located at an outer side of the second substrate away from the intermediate space.

Accordingly, through the switching of the electric field applied to the light-adjusting layer, the light-adjusting mode of the multi-function light-adjusting glass can be adjusted. Accordingly, the multi-function light-adjusting glass can conveniently switch among the functions of light transmission, heat insulation and privacy protection through the use of the first and second polarizing boards and the light-adjusting layer according to the requirement. Therefore, the multi-function light-adjusting glass has a simplified structure, and is easy to switch among the multiple functions.

In a first example, the first polarizing board has a first polarization direction parallel to a second polarization direction of the second polarizing board. The first polarization direction of the first polarizing board is parallel to the first alignment direction of the first alignment film, and the second polarization direction of the second polarizing board is orthogonal to the second alignment direction of the second alignment film. Thus, a polarization direction of the incident light is adjusted by the first polarizing board, and the condition after the incident light passing through is controlled by the second polarizing board according to the property of the incident light, leading to maintenance of the light-adjusting condition.

In the first example, the plurality of liquid crystal molecules is aligned in the first and second alignment directions of the first and second alignment films when the first and second electrically conductive films apply an initial voltage to the light-adjusting layer. The initial voltage causes the plurality of liquid crystal molecules to orient in a vertical direction at the top side and to gradually become horizontally-oriented from the top side down. The incident light passes through the first polarizing board and becomes a polarized light having a polarization direction same as the first polarization direction of the first polarizing board, and the polarized light directly passes through the light-adjusting layer and the second polarizing board. Thus, the transmittance of the incident light is relatively higher, and the light-adjusting glass switches to a transparent mode.

In the first example, the plurality of liquid crystal molecules is guided in the first and second alignment directions of the first and second alignment films and a direction of an electric field when the first and second electrically conductive films apply another voltage to the light-adjusting layer to generate the electric field. The other voltage causes rotation of the plurality of liquid crystal molecules. The incident light passes through the first polarizing board and becomes a polarized light having a polarization direction same as the first polarization direction of the first polarizing board. The polarization direction of the polarized light rotates by 90 degrees after passing through the light-adjusting layer, and the second polarizing board blocks the polarized light whose polarization direction was rotated by 90 degrees. Thus, the incident light is blocked and absorbed by the first and second polarizing boards, and the light-adjusting glass switch to absorption mode.

In a second example, the first polarizing board has a first polarization direction orthogonal to a second polarization direction of the second polarizing board. The first and second polarization directions of the first and second polarizing boards are parallel to the first and second alignment directions of the first and second alignment films, respectively. Thus, a polarization direction of the incident light is adjusted by the first polarizing board, and the condition after the incident light passing through is controlled by the second polarizing board according to the property of the incident light, changing the light-adjusting condition.

In a third example, the first polarizing board has a first polarization direction orthogonal to a second polarization direction of the second polarizing board. The first and second polarization directions of the first and second polarizing boards are orthogonal to the first and second alignment directions of the first and second alignment films, respectively. Thus, a polarization direction of the incident light is adjusted by the first polarizing board, and the condition after the incident light passing through is controlled by the second polarizing board according to the property of the incident light, changing the light-adjusting condition.

In the second and third examples, the plurality of liquid crystal molecules is aligned in the first and second alignment directions of the first and second alignment films when the first and second electrically conductive films apply an initial voltage to the light-adjusting layer. The initial voltage causes the plurality of liquid crystal molecules to orient in a vertical direction at the top side and to gradually become horizontally-oriented from the top side down. The incident light passes through the first polarizing board and becomes a polarized light having a polarization direction same as the first polarization direction of the first polarizing board, and the polarized light directly passes through the light-adjusting layer and is blocked by the second polarizing board. Thus, the incident light is blocked and absorbed by the first and second polarizing boards, and the light-adjusting glass switch to absorption mode.

In the second and third examples, the plurality of liquid crystal molecules is guided in the first and second alignment directions of the first and second alignment films and a direction of an electric field when the first and second electrically conductive films apply another voltage to the light-adjusting layer to generate the electric field. The other voltage causes rotation of the plurality of liquid crystal molecules, and the incident light passes through the first polarizing board and becomes a polarized light having a polarization direction same as the first polarization direction of the first polarizing board. The polarization direction of the polarized light rotates by 90 degrees after passing through the light-adjusting layer, and the polarized light directly passes through the second polarizing board. Thus, the transmittance of the incident light is relatively higher, and the light-adjusting glass switches to a transparent mode.

In these examples, a frequency of a third voltage is adjusted between 60 to 6000 Hz when the first and second electrically conductive films apply the third voltage to the light-adjusting layer. Thus, the functions of the light-adjusting glass can be switched by adjusting the frequency of the voltage, which enhances the operability and the applicability.

In these examples, the plurality of liquid crystal molecules is nematic liquid crystal materials with negative dielectric anisotropy. Thus, the application of an electric field to the liquid crystal molecule causes the director of the liquid crystal molecule to be perpendicular to the electric field. In this regard, the polarization direction of the incident light can be controlled.

In these examples, the plurality of salt-in ions is anions and cations dissociated from the type of salt dissolving in water or liquid crystal. Thus, anions and cations of the plurality of salt-in ions can widely disturb the plurality of liquid crystal molecules, which enhances the scattering of the incident light.

In these examples, the first and second substrates are made of glass, acrylic or plastic, and the first and second electrically conductive films are made from indium tin oxide, silver nanowire, or transparent electrically conductive metal. Thus, the absorption of the incident light by the substrates is decreased, such that the difference between the transparent mode and the absorption mode is increased.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIGS. 2a-2c show the switching among the functions of the multi-function light-adjusting glass of the first embodiment under a particular light-incident condition.

Figure 1:
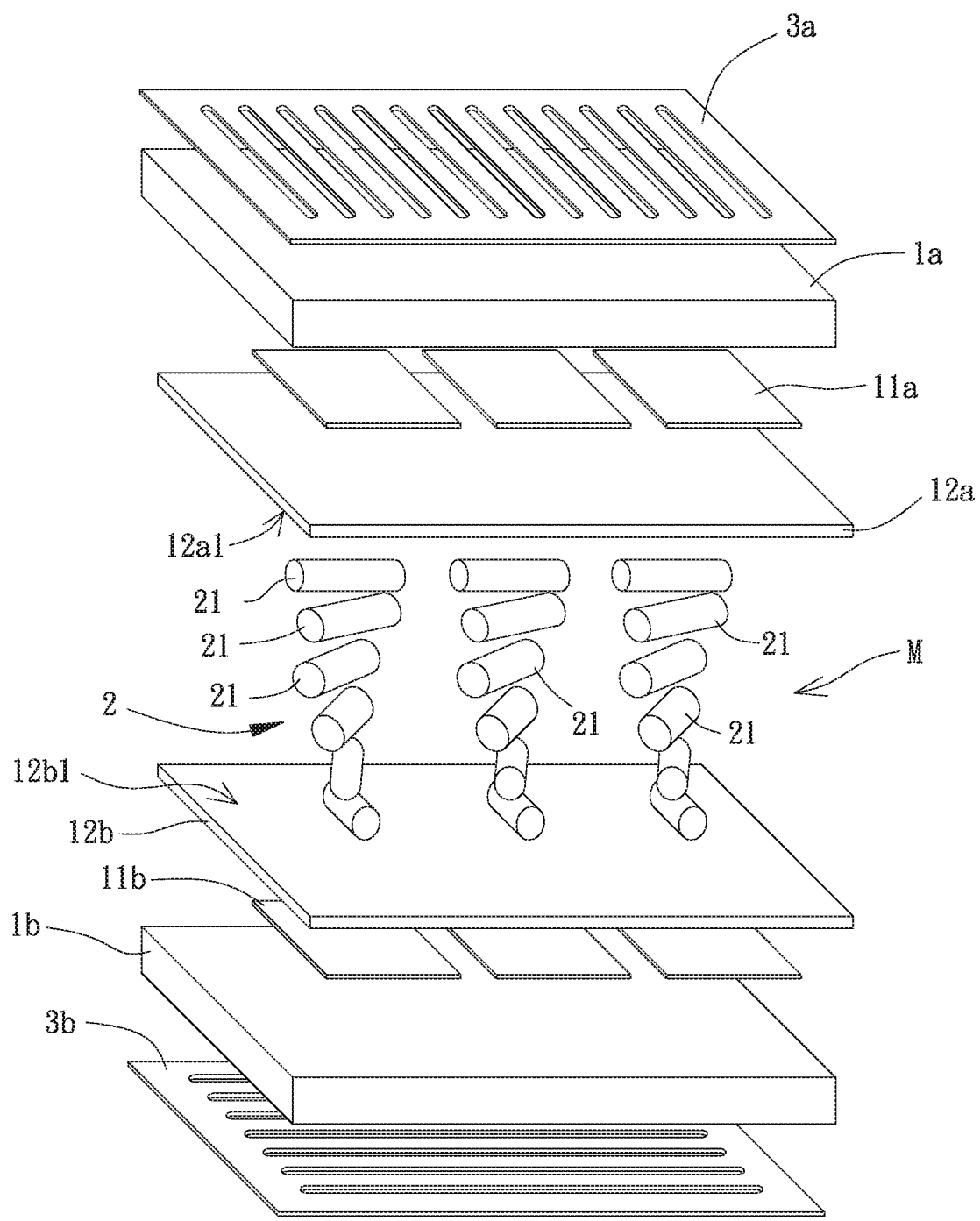
FIG. 1 is an exploded view of a multi-function light-adjusting glass of a first embodiment according to the present invention.

In the various figures of the drawings, the same numerals designate the same or similar parts. Furthermore, when the term "first", "second", "third", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

With reference to FIG. 1, a multi-function light-adjusting glass of a first embodiment according to the present invention includes a first substrate 1a, a second substrate 1b, a light-adjusting layer 2, a first polarizing board 3a and a second polarizing board 3b. The light-adjusting layer 2 is disposed between the first and second substrates 1a and 1b. The first polarizing board 3a is located at an outer side of the first substrate 1a away from the light-adjusting layer 2, and the second polarizing board 3b is located at an outer side of the second substrate 1b away from the light-adjusting layer 2.

With reference to FIGS. 1 and 2a-2c, the first and second substrates 1a and 1b delimit a layer of intermediate space M therebetween. The first and second substrates 1a and 1b are arranged in parallel to each other. The first substrate 1a includes a first electrically conductive film 11a on a surface of the first substrate 1a facing the intermediate space M, and the second substrate 1b includes a second electrically conductive film 11b on a surface of the second substrate 1b facing the intermediate space M. When the first and second electrically conductive films 11a and 11b are electrified, an electric field is created in the intermediate space M. The first substrate 1a further includes a first alignment film 12a formed on a surface of the first electrically conductive film 11a facing the intermediate space M, and the second substrate 1b further includes a second alignment film 12b formed on a surface of the second electrically conductive film 11b facing the intermediate space M. In this arrangement, a guiding face 12a1 of the first alignment film 12a faces the intermediate space M, and a guiding face 12b1 of the second alignment film 12b faces the intermediate space M. The first and second substrates 1a and 1b are preferably made of materials which are light transmissible but not air permeable, such as glass, acrylic or plastic. The first and second electrically conductive films 11a and 11b can be made from transparent electrically conductive materials whose weight and thickness can be reduced, such as indium tin oxide (ITO), silver nanowires or transparent electrically conductive metal. The first and second alignment films 12a and 12b can be made from polyimide (PI). Through the method of rubbing orientation, the two guiding faces 12a1 and 12b1 of the first and second alignment films 12a and 12b are provided with a plurality of grooves aligned with each other in the same orientation. This attains an alignment effect and provides the first and second alignment films 12a and 12b with first and second alignment directions D1 and D2, respectively. The first and second alignment directions D1 and D2 of the first and second alignment films 12a and 12b are preferably orthogonal to each other.

The light-adjusting layer 2 is disposed in the intermediate space M and includes a plurality of liquid crystal molecules 21 and a plurality of salt-in ions (not shown) containing a type of salt distributed between the plurality of liquid crystal molecules 21. The plurality of liquid crystal molecules 21 can be nematic liquid crystal materials with negative dielectric anisotropy. The application of an electric field to the liquid crystal molecule 21 causes the director of the liquid crystal molecule 21 to be perpendicular to the electric field. The salt-in ions are anions and cations dissociated from the type of salt dissolving in water or liquid crystal. The type of salt can be sodium chloride (NaCl), calcium sulfate ($CaSO_4$), sodium carbonate ($Na_2CO_3$), sodium hydrogen carbonate ($NaHCO_3$), potassium nitrate ($KNO_3$), tetrabutylammonium bromide (TBAB), tetrabutylammonium hydrogen sulfate (TBAHS), tetrabutylammonium chloride (TBACl), tetrabutylammonium hexafluorophosphate (TBAHFP), or tetrabutylammonium tetrafluoroborate (TBATFB). The weight ratio of the plurality of liquid crystal molecules 21 to the plurality of salt-in ions is preferably 99:1 but is not limited thereto.

Furthermore, the liquid crystal molecules 21 that are adjacent to the first alignment film 12a are aligned along the first alignment direction D1 of the first alignment film 12a, and the liquid crystal molecules 21 that are adjacent to the second alignment film 12b are aligned along the second alignment direction D2 of the second alignment film 12b. As a result, the top portion of the plurality of liquid crystal molecules 21 is vertically oriented relative to the first alignment film 12a and perpendicular to the horizontal direction in which the bottom portion of the plurality of liquid crystal molecules 21 is oriented. The electric field generated by the first and second electrically conductive films 11a and 11b is applied to the plurality of liquid crystal molecules 21 and the plurality of salt-in ions.

The first polarizing board 3a is located at an outer side of the first substrate 1a away from the light-adjusting layer 2, and the second polarizing board 3b is located at an outer side of the second substrate 1b away from the light-adjusting layer 2. The first and second polarizing boards 3a and 3b have first and second polarization directions Z1 and Z2 parallel to each other. The first polarization direction Z1 of the first polarizing board 3a is orthogonal to the first alignment direction D1 of the first alignment film 12a. The second polarization direction Z2 of the second polarizing board 3b is parallel to the second alignment direction D2 of the second alignment film 12b.

With reference to FIGS. 2a-2c and 4, according to the mentioned structure, the operational mode of the multi-function light-adjusting glass of the invention can be changed by adjusting the magnitude of the electric field applied. First, as shown in FIG. 2a, an incident light L passes through the first polarizing board 3a at the top side of the multi-function light-adjusting glass to form a beam of polarized light having a polarization direction Z' which is in the same direction as the first polarization direction Z1. When an initial voltage $V_0$ is applied to the light-adjusting layer 2, the plurality of liquid crystal molecules 21 is not affected by the electric field. The plurality of liquid crystal molecules 21 is vertically oriented at the top side but gradually become horizontally-oriented from the top side down as guided in the first and second alignment directions D1 and D2 of the first and second alignment films 12a and 12b, permitting the polarized incident light L (with the polarization direction Z') to directly pass through the second polarizing board 3b (with the second polarization direction Z2 which is in the same direction as the first polarization direction Z1) at the bottom side without changing its polarization orientation Z' in the light-adjusting layer 2. In this regard, since the transmittance of the incident light L is relatively higher, the light-adjusting glass is in a transparent mode T, thereby allowing for light transmission and providing an open view.

Furthermore, as shown in FIG. 2*b*, when a first voltage $V_1$ is applied to the light-adjusting layer 2, the plurality of liquid crystal molecules 21 is rotated from the top side down as affected by the electric field and the first and second alignment films 12*a* and 12*b*. After the incident light L passes through the light-adjusting layer 2, the polarization direction Z' of the incident light L rotates by 90 degrees and is perpendicular to the second polarization direction Z2 of the second polarizing board 3*b* at the bottom side. In this situation, since the first and second polarizing boards 3*a* and 3*b* block and absorb the incident light L, the light-adjusting glass is in an absorption mode A, providing a light-shading effect and a heat-insulating effect.

Furthermore, as shown in FIG. 2*c*, when a second voltage $V_2$ is applied to the light-adjusting layer 2, the salt-in ions are disturbed by the electric field. This leads to a discontinuous and chaotic arrangement of the plurality of liquid crystal molecules 21 and causes the incident light L to scatter in the light-adjusting layer 2. In this regard, since the view information contained in the incident light L cannot remain as it was, the light-adjusting glass is in a scattering mode S, thereby providing a translucent effect and a privacy-protecting effect.

Figure 3A:
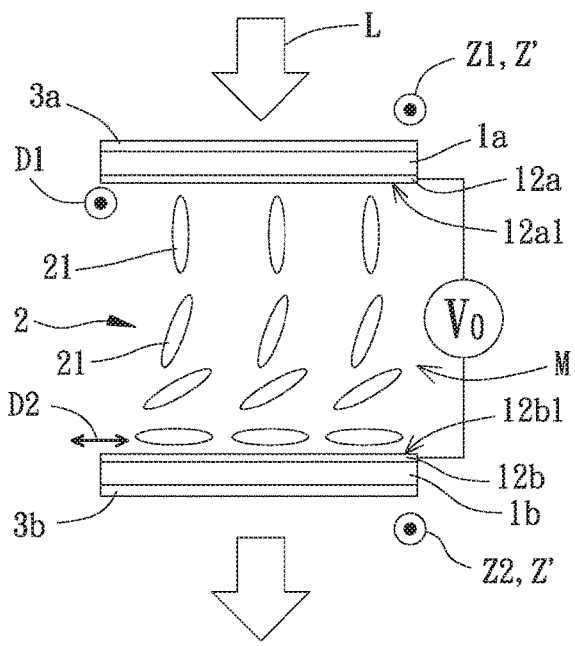
FIGS. 3a-3c show the switching among the functions of the multi-function light-adjusting glass of the first embodiment under another light-incident condition.
Figure 3B:
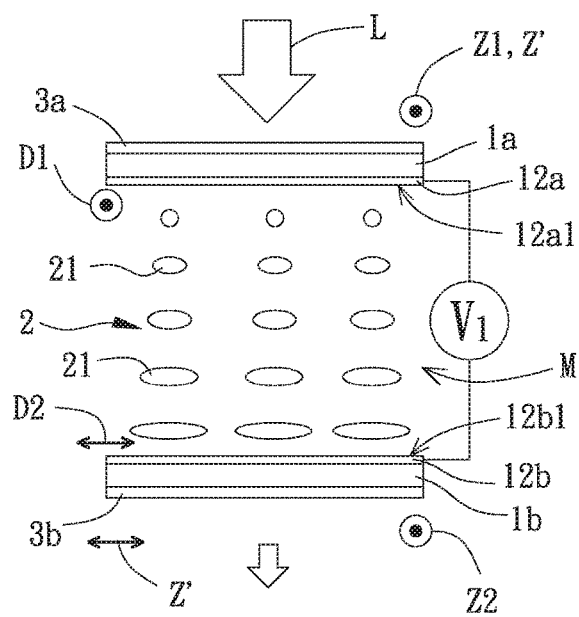
Figure 3C:
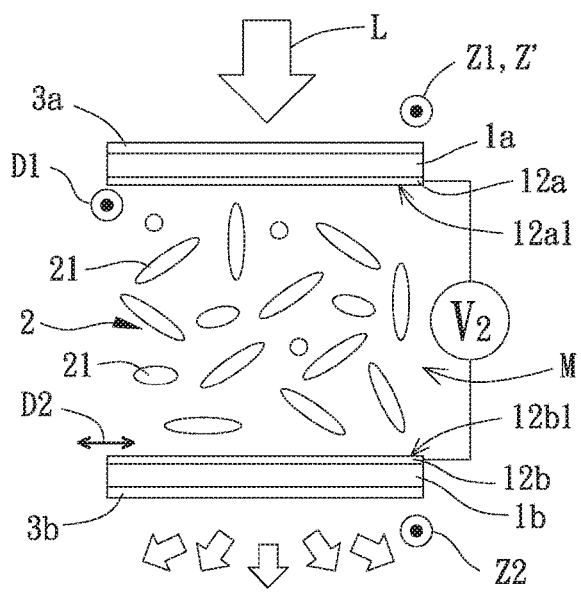

In addition, FIGS. 3*a*-3*c* show the use of the multi-function light-adjusting glass of the first embodiment under different angles and directions of the incident light L. Through the switch among the initial voltage $V_0$, the first voltage $V_1$ and the second voltage $V_2$, the multi-function light-adjusting glass can render the transparent mode T of FIG. 3*a*, the absorption mode A of FIG. 3*b*, and the scattering mode S of FIG. 3*c*.

Figure 4:
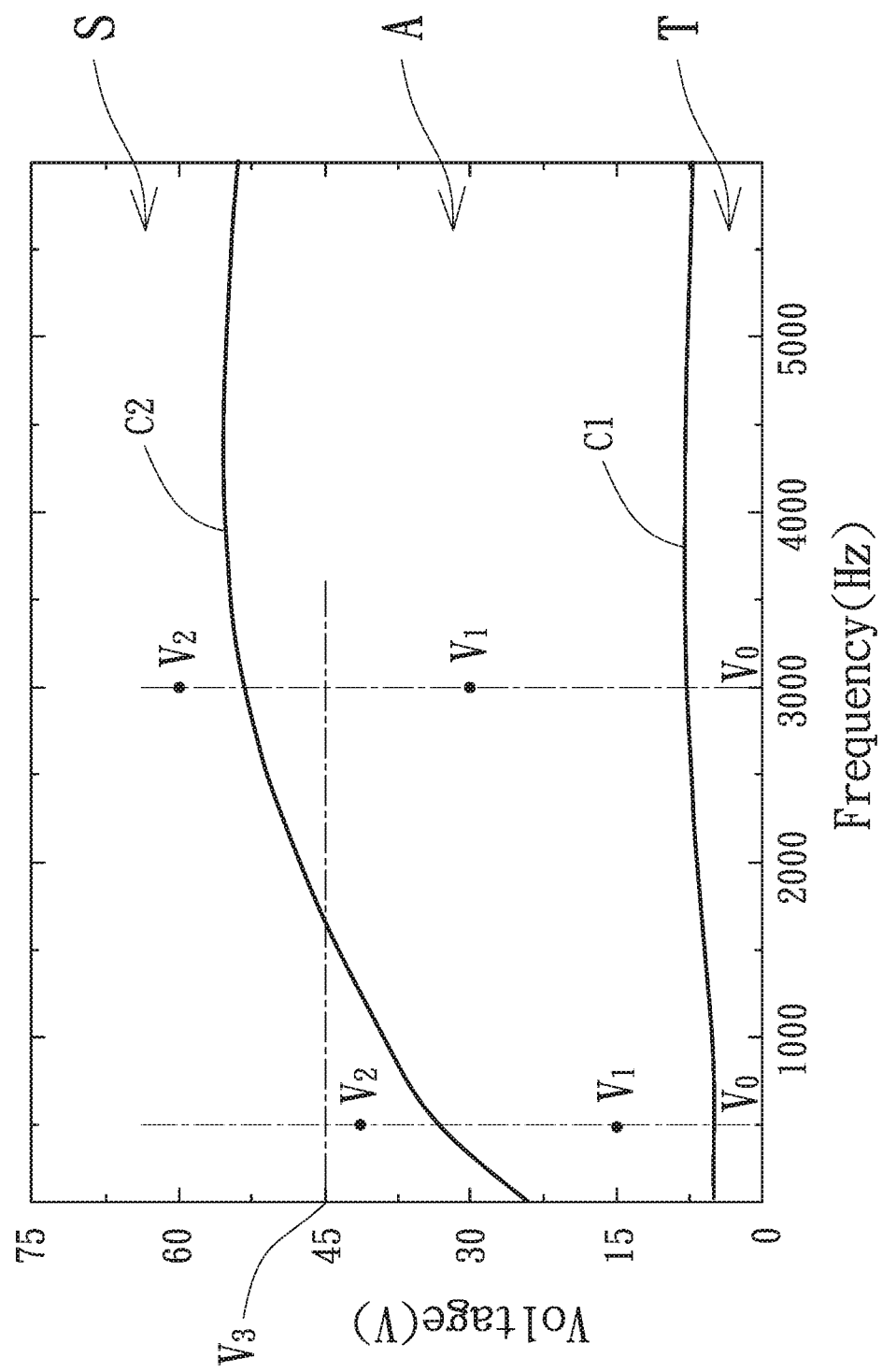
FIG. 4 shows a voltage-frequency diagram of the individual functions of the multi-function light-adjusting glass of the first embodiment.

FIG. 4 shows a voltage-frequency diagram in the transparent mode T, the absorption mode A and the scattering mode S. The transparent mode T and the absorption mode A are separated by a first boundary line C1, which is a voltage-frequency curve switching from the initial voltage $V_0$ to the first voltage $V_1$. Besides, the absorption mode A and the scattering mode S are divided by a second boundary line C2, which is a voltage-frequency curve switching from the first voltage $V_1$ to the second voltage $V_2$. Therefore, the magnitudes of the initial voltage $V_0$, the first voltage $V_1$ and the second voltage $V_2$ as chosen need to be adjusted according to the change in frequency. For example, when the frequency of the power is 500 Hz, the initial voltage $V_0$ may be 0 V, the first voltage $V_1$ may be 15 V, and the second voltage $V_2$ may be 40 V. When the frequency of the power is 3000 Hz, the initial voltage $V_0$ may be 0 V, the first voltage $V_1$ may be 30 V, and the second voltage $V_2$ may be 60 V.

In other words, with reference to FIG. 4 again, the multi-function light-adjusting glass of this invention can further be applied with a third voltage $V_3$. The operational mode of the multi-function light-adjusting glass can be adjusted by changing the frequency but fixing the voltage of the third voltage $V_3$. The frequency of the third voltage $V_3$ can be adjusted between 60 and 6000 Hz. For example, when the third voltage $V_3$ is fixed at 45 V, the operational mode can be the absorption mode A when the frequency is adjusted as 2000 Hz, or can be the scattering mode S when the frequency is adjusted as 1000 Hz.

Figure 5A:
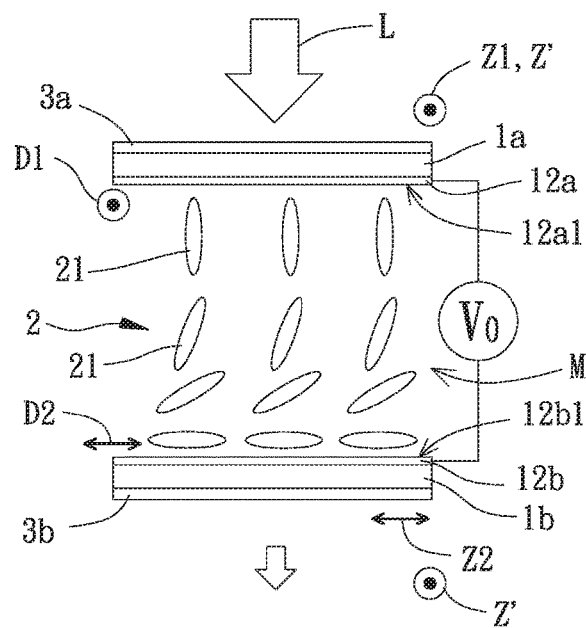
FIGS. 5a-5c show the switching among the functions of the multi-function light-adjusting glass of a second embodiment.
Figure 5B:
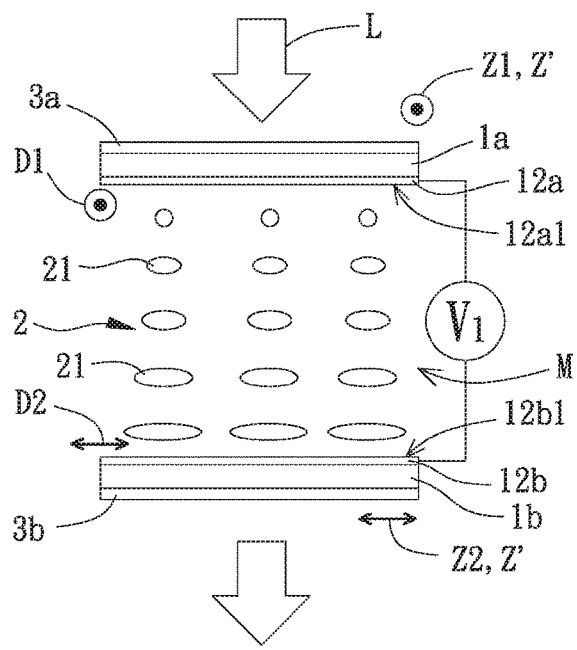
Figure 5C:
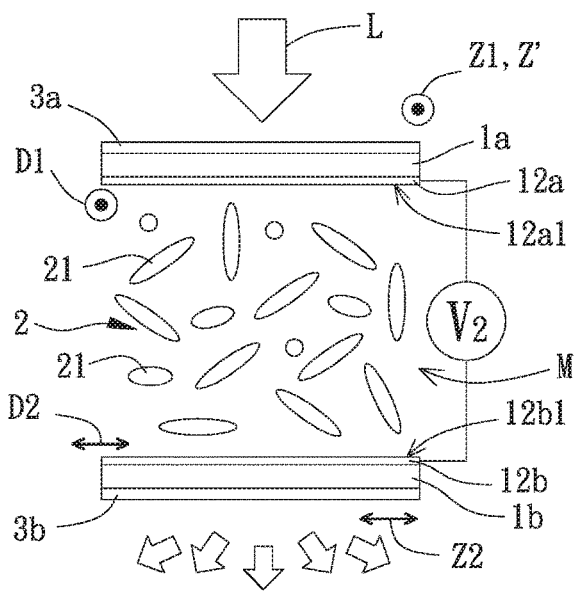

FIGS. 5*a*-5*c* show a multi-function light-adjusting glass of a second embodiment according to the present invention. The first and second polarization directions Z1 and Z2 of the first and second polarizing boards 3*a* and 3*b* are orthogonal to each other. In this regard, after the incident light L passes through the first polarizing board 3*a* at the top side of the multi-function light-adjusting glass, the polarization direction Z' of the incident light L becomes perpendicular to the second polarization direction Z2 of the second polarizing board 3*b* at the bottom side. Besides, the first polarization direction Z1 of the first polarizing board 3*a* is parallel to the first alignment direction D1 of the first alignment film 12*a*, and the second polarization direction Z2 of the second polarizing board 3*b* is parallel to the second alignment direction D2 of the second alignment film 12*b*. Thus, the multi-function light-adjusting glass enters the absorption mode A when a weak voltage or no voltage is applied thereto. In this regard, the multi-function light-adjusting glass is switched to the transparent mode T or the scattering mode S when the voltage is increased.

With reference to FIG. 5*a*, when the initial voltage $V_0$ is applied, the plurality of liquid crystal molecules 21 is not affected by the electric field. As a result, the polarization direction Z' of the incident light L remains perpendicular to the second polarization direction Z2 of the second polarizing board 3 at the bottom side after the incident light L passes through the light-adjusting layer 2, causing the incident light L to be blocked by the second polarizing board 3*b* at the bottom side. This is the case of the absorption mode A. Moreover, as shown in FIG. 5*b*, the application of the first voltage $V_1$ causes rotation of the plurality of liquid crystal molecules 21, rotating the polarization direction Z' of the incident light L by 90 degrees in the light-adjusting layer 2 and making the polarization direction Z' of the incident light L parallel to the second polarization direction Z2 of the second polarizing board 3*b* at the bottom side. The incident light L can directly pass through the second polarizing board 3*b* at the bottom side, which is the transparent mode T. Furthermore, as shown in FIG. 5*c*, the application of the second voltage $V_2$ makes the incident light L scatter in the light-adjusting layer 2, which is the scattering mode S.

Figure 6A:
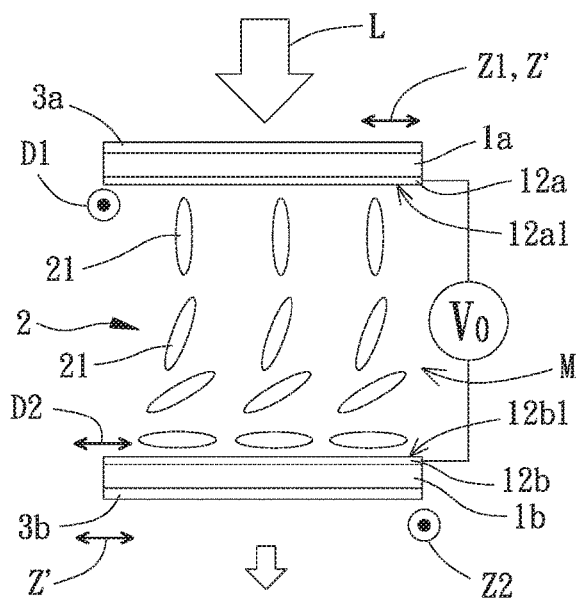
FIGS. 6a-6c show the switching among the functions of the multi-function light-adjusting glass of a third embodiment.
Figure 6B:
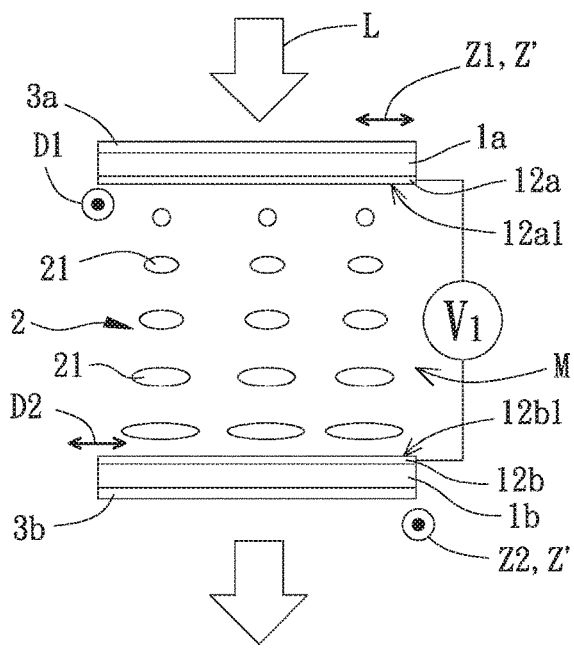
Figure 6C:
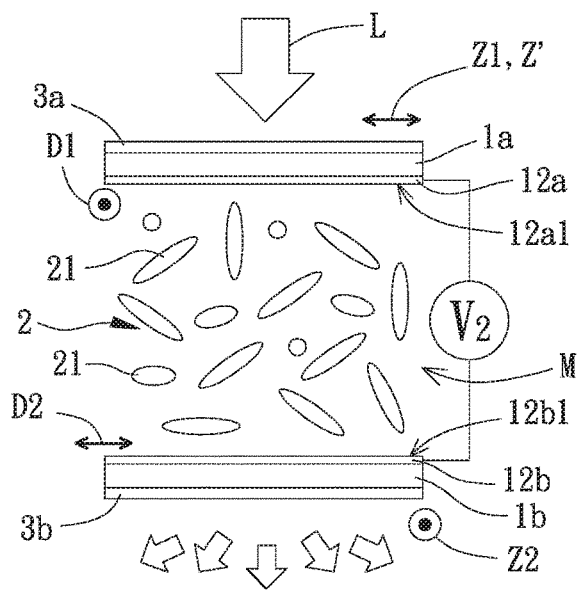

FIGS. 6*a*-6*c* shows a multi-function light-adjusting glass of a third embodiment according to the present invention. The first and second polarization directions Z1 and Z2 of the first and second polarizing boards 3*a* and 3*b* are orthogonal to each other. The first and second polarization directions Z1 and Z2 of the first and second polarizing boards 3*a* and 3*b* are orthogonal to the first and second alignment directions D1 and D2 of the first and second alignment films 12*a* and 12*b*, respectively. The switching of the operational mode of the third embodiment is similar to the second embodiment. FIGS. 6*a*-6*c* show the absorption mode A, the transparent mode T and the scattering mode S of the multi-function light-adjusting glass, respectively.

In view of the foregoing, the multi-function light-adjusting glass of the present invention is able to adjust the polarization direction of an incident light using the first polarizing board and to control the state of the incident light passing through the multi-function light-adjusting glass using the second polarizing board. In addition, through the switching of the electric field applied to the light-adjusting layer, the light-adjusting mode of the multi-function light-adjusting glass can be adjusted. Accordingly, the multi-function light-adjusting glass can conveniently switch among the functions of light transmission, heat insulation and privacy protection through the use of the first and second polarizing boards and the light-adjusting layer according to the requirement. Therefore, the multi-function light-adjusting glass has a simplified structure, and is easy to switch among the multiple functions.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A multi-function light-adjusting glass comprising:
a first substrate disposed in a top side;
a second substrate disposed in a bottom side, wherein the first substrate and the second substrate delimit an intermediate space therebetween, the first substrate includes a first electrically conductive film on an inner surface of the first substrate facing the intermediate space, as well as a first alignment film disposed between the first electrically conductive film and the intermediate space, the second substrate includes a second electrically conductive film on an inner surface of the second substrate facing the intermediate space, as well as a second alignment film disposed between the second electrically conductive film and the intermediate space, and the first alignment film has a first alignment direction orthogonal to a second alignment direction of the second alignment film;
a light-adjusting layer disposed in the intermediate space and including a plurality of liquid crystal molecules and a plurality of salt-in ions containing a type of salt, wherein the plurality of salt-in ions is distributed between the plurality of liquid crystal molecules, a portion of the plurality of liquid crystal molecules is relatively adjacent to the first alignment film and is aligned in the first alignment direction of the first alignment film, another portion of the plurality of liquid crystal molecules is relatively adjacent to the second alignment film and is aligned in the second alignment direction of the second alignment film, the plurality of salt-in ions is affected by a voltage in a first case that the first electrically conductive film and the second electrically conductive film apply the voltage to the light-adjusting layer, the voltage disturbs the plurality of liquid crystal molecules and thereby causes a discontinuous and chaotic arrangement of the plurality of liquid crystal molecules and causes an incident light to scatter in the light-adjusting layer;
a first polarizing board arranged in a first polarization direction and located at an outer side of the first substrate away from the intermediate space, wherein the first polarization direction is parallel to the first alignment direction; and
a second polarizing board arranged a second polarization direction and located at an outer side of the second substrate away from the intermediate space, wherein the second polarizing direction is parallel to the first polarization direction, and the second polarization direction is orthogonal to the second alignment direction of the second alignment film;
wherein the plurality of liquid crystal molecules is aligned in the first and second alignment directions of the first and second alignment films in a second case that the first and second electrically conductive films apply an initial voltage to the light-adjusting layer, wherein the initial voltage causes the plurality of liquid crystal molecules to orient in a vertical direction at the top side and to gradually become horizontally-oriented from the top side down, wherein the incident light passes through the first polarizing board and becomes a polarized light having a polarization direction same as the first polarization direction of the first polarizing board, and wherein the polarized light directly passes through the light-adjusting layer and the second polarizing board.

2. The multi-function light-adjusting glass as claimed in claim 1, wherein
the plurality of liquid crystal molecules is guided in the first alignment direction, the second alignment direction, and a direction of an electric field in a third case that the first electrically conductive film and the second electrically conductive film apply a second voltage to the light-adjusting layer to generate the electric field, wherein the second voltage causes rotation of the plurality of liquid crystal molecules, the incident light passes through the first polarizing board and becomes a polarized light having a polarization direction same as the first polarization direction of the first polarizing board, the polarized light rotates by 90 degrees after passing through the light-adjusting layer, and the second polarizing board blocks the polarized light whose polarization direction was rotated by 90 degrees.

3. The multi-function light-adjusting glass as claimed in claim 1, wherein the first electrically conductive film and the second electrically conductive film apply a third voltage to the light-adjusting layer, and a frequency of the third voltage is between 60 to 6000 Hz.

4. The multi-function light-adjusting glass as claimed in claim 1, wherein the plurality of liquid crystal molecules is nematic liquid crystal materials with negative dielectric anisotropy.

5. The multi-function light-adjusting glass as claimed in claim 1, wherein the plurality of salt-in ions is anions and cations dissociated from the type of salt dissolving in water or liquid crystal.

6. The multi-function light-adjusting glass as claimed in claim 1, wherein the first substrate and the second substrate are made of glass, acrylic or plastic, and the first electrically conductive film and the second electrically conductive film are made from indium tin oxide, silver nanowire, or transparent electrically conductive metal.

7. A multi-function light-adjusting glass, comprising:
a first substrate disposed in a top side;
a second substrate disposed in a bottom side, wherein the first substrate and the second substrate delimit an intermediate space therebetween, the first substrate includes a first electrically conductive film on an inner surface of the first substrate facing the intermediate space, as well as a first alignment film disposed between the first electrically conductive film and the intermediate space, the second substrate includes a second electrically conductive film on an inner surface of the second substrate facing the intermediate space, as well as a second alignment film disposed between the second electrically conductive film and the intermediate space, and the first alignment film has a first alignment direction orthogonal to a second alignment direction of the second alignment film;
a light-adjusting layer disposed in the intermediate space and including a plurality of liquid crystal molecules and a plurality of salt-in ions containing a type of salt, wherein the plurality of salt-in ions is distributed between the plurality of liquid crystal molecules, a portion of the plurality of liquid crystal molecules is relatively adjacent to the first alignment film and is aligned in the first alignment direction of the first alignment film, another portion of the plurality of liquid crystal molecules is relatively adjacent to the second alignment film and is aligned in the second alignment direction of the second alignment film, the plurality of salt-in ions is affected by a voltage in a first case that the first electrically conductive film and second electrically conductive film apply the voltage to the light-adjusting layer, the voltage disturbs the plurality of liquid crystal molecules and thereby causes a discontinuous and chaotic arrangement of the plurality of liquid crystal molecules and causes an incident light to scatter in the light-adjusting layer;

a first polarizing board arranged in a first polarizing direction and located at an outer side of the first substrate away from the intermediate space; and a second polarizing board arranged in a second polarizing direction and located at an outer side of the second substrate away from the intermediate space;

wherein the first polarization direction is orthogonal to the second polarization direction, and the first polarization direction and the second polarization direction are parallel to the first alignment direction and the second alignment direction, respectively; and wherein the plurality of liquid crystal molecules is aligned in the first and second alignment directions of the first and second alignment films in a second case that the first and second electrically conductive films apply an initial voltage to the light-adjusting layer, wherein the initial voltage causes the plurality of liquid crystal molecules to orient in a vertical direction at the top side and to gradually become horizontally-oriented from the top side down, wherein the incident light passes through the first polarizing board and becomes a polarized light having a polarization direction same as the first polarization direction of the first polarizing board, and wherein the polarized light directly passes through the light-adjusting layer and is blocked by the second polarizing board.

8. The multi-function light-adjusting glass as claimed in claim 5, wherein the plurality of liquid crystal molecules is guided in the first alignment direction, the second alignment, and a direction of an electric field in a third case that the first electrically conductive film and the second electrically conductive film apply a second voltage to the light-adjusting layer to generate the electric field, the second voltage causes rotation of the plurality of liquid crystal molecules, the incident light passes through the first polarizing board and becomes a polarized light having a polarization direction same as the first polarization direction of the first polarizing board, wherein the polarization direction of the polarized light rotates by 90 degrees after passing through the light-adjusting layer, and the polarized light directly passes through the second polarizing board.

9. The multi-function light-adjusting glass as claimed in claim 7, wherein the first electrically conductive film and the second electrically conductive film apply a third voltage to the light-adjusting layer, and a frequency of the third voltage is between 60 to 6000 Hz.

10. The multi-function light-adjusting glass as claimed in claim 7, wherein the plurality of liquid crystal molecules is nematic liquid crystal materials with negative dielectric anisotropy.

11. The multi-function light-adjusting glass as claimed in claim 7, wherein the plurality of salt-in ions is anions and cations dissociated from the type of salt dissolving in water or liquid crystal.

12. The multi-function light-adjusting glass as claimed in claim 7, wherein the first substrate and the second substrate are made of glass, acrylic or plastic, and the first electrically conductive film and the second electrically conductive film are made from indium tin oxide, silver nanowire, or transparent electrically conductive metal.

13. A multi-function light-adjusting glass, comprising:

a first substrate disposed in a top side;

a second substrate disposed in a bottom side, wherein the first substrate and the second substrate delimit an intermediate space therebetween, the first substrate includes a first electrically conductive film on an inner surface of the first substrate facing the intermediate space, as well as a first alignment film disposed between the first electrically conductive film and the intermediate space, the second substrate includes a second electrically conductive film on an inner surface of the second substrate facing the intermediate space, as well as a second alignment film disposed between the second electrically conductive film and the intermediate space, and the first alignment film has a first alignment direction orthogonal to a second alignment direction of the second alignment film;

a light-adjusting layer disposed in the intermediate space and including a plurality of liquid crystal molecules and a plurality of salt-in ions containing a type of salt, wherein the plurality of salt-in ions is distributed between the plurality of liquid crystal molecules, a portion of the plurality of liquid crystal molecules is relatively adjacent to the first alignment film and is aligned in the first alignment direction of the first alignment film, another portion of the plurality of liquid crystal molecules is relatively adjacent to the second alignment film and is aligned in the second alignment direction of the second alignment film, the plurality of salt-in ions is affected by a voltage in a first case that the first electrically conductive film and the second electrically conductive film apply the voltage to the light-adjusting layer, the voltage disturbs the plurality of liquid crystal molecules and thereby causes a discontinuous and chaotic arrangement of the plurality of liquid crystal molecules and causes an incident light to scatter in the light-adjusting layer;

a first polarizing board arranged in a first polarization direction and located at an outer side of the first substrate away from the intermediate space; and a second polarizing board arranged in a second polarization direction and located at an outer side of the second substrate away from the intermediate space;

wherein the first polarization direction orthogonal to the second polarization direction, and the first polarization direction and the second polarization direction are orthogonal to the first alignment direction and the second alignment direction, respectively; and wherein the plurality of liquid crystal molecules is aligned in the first and second alignment directions of the first and second alignment films in a second case that the first and second electrically conductive films apply an initial voltage to the light-adjusting layer, wherein the initial voltage causes the plurality of liquid crystal molecules to orient in a vertical direction at the top side and to gradually become horizontally-oriented from the top side down, wherein the incident light passes through the first polarizing board and becomes a polarized light having a polarization direction same as the first polarization direction of the first polarizing board, and wherein the polarized light directly passes through the light-adjusting layer and is blocked by the second polarizing board.

14. The multi-function light-adjusting glass as claimed in claim 13, wherein the plurality of liquid crystal molecules is guided in the first alignment direction, the second alignment direction, and a direction of an electric field in a third case that the first electrically conductive film and the second electrically conductive film apply a second voltage to the light-adjusting layer to generate the electric field, the second voltage causes rotation of the plurality of liquid crystal molecules, the incident light passes through the first polarizing board and becomes a polarized light having a polarization direction same as the first polarization direction of the first polarizing board, wherein the polarization direction of the polarized light rotates by 90 degrees after passing through the light-adjusting layer, and the polarized light directly passes through the second polarizing board.

15. The multi-function light-adjusting glass as claimed in claim 13, wherein the first electrically conductive film and the second electrically conductive film apply a third voltage to the light-adjusting layer, and a frequency of the third voltage is between 60 to 6000 Hz.

16. The multi-function light-adjusting glass as claimed in claim 13, wherein the plurality of liquid crystal molecules is nematic liquid crystal materials with negative dielectric anisotropy.

17. The multi-function light-adjusting glass as claimed in claim 13, wherein the plurality of salt-in ions is anions and cations dissociated from the type of salt dissolving in water or liquid crystal.

18. The multi-function light-adjusting glass as claimed in claim 13, wherein the first substrate and the second substrate are made of glass, acrylic or plastic, and the first electrically conductive film and the second electrically conductive film are made from indium tin oxide, silver nanowire, or transparent electrically conductive metal.

* * * * *